United States Patent
Harter et al.

(10) Patent No.: US 6,183,116 B1
(45) Date of Patent: Feb. 6, 2001

(54) LAMP RETAINER RING AND LAMPHOLDER ASSEMBLY

(75) Inventors: Kenneth J. Harter, Lakewood; Antoine Kanaan, Alta Loma, both of CA (US)

(73) Assignee: New Bedford Panoramex Corporation, Upland, CA (US)

( * ) Notice: Under 35 U.S.C. 154(b), the term of this patent shall be extended for 0 days.

(21) Appl. No.: 09/255,171

(22) Filed: Feb. 22, 1999

(51) Int. Cl.[7] ............................. B60Q 1/00; F21V 11/00
(52) U.S. Cl. ..................... 362/368; 362/374; 362/375; 362/287; 362/455; 362/427; 362/362
(58) Field of Search ..................... 362/368, 374, 362/375, 440, 455, 456, 427, 287

(56) References Cited

U.S. PATENT DOCUMENTS

| | | | |
|---|---|---|---|
| 608,610 | * 8/1898 | Kirby, Jr. ............................. | 362/375 |
| 1,590,017 | * 6/1926 | Godley ................................ | 362/374 |
| 2,180,982 | * 11/1939 | Foulds ................................ | 362/374 |
| 2,768,283 | * 10/1956 | Arnejo ................................ | 362/374 |
| 4,210,846 | 7/1980 | Capewell et al. . | |
| 4,977,353 | 12/1990 | Helal et al. . | |
| 5,105,124 | 4/1992 | Futsuhara et al. . | |
| 5,168,198 | 12/1992 | Watanabe . | |
| 5,397,963 | 3/1995 | Manson . | |
| 5,677,896 | * 10/1997 | Nunes ................................ | 362/413 |

* cited by examiner

Primary Examiner—Sandra O'Shea
Assistant Examiner—Ali Alavi
(74) Attorney, Agent, or Firm—Stout, Uxa, Buyan & Mullins, LLP; Frank J. Uxa

(57) ABSTRACT

Apparatus for use in retaining a lamp in a housing include a member having a central opening, a first sidewall facing the central opening, a substantially opposing second sidewall facing away from the central opening, a front wall extending between the first and second sidewalls and a substantially opposing back wall extending between the first and second sidewalls. A plurality of spaced apart through holes passing through the member from the front wall to the back wall are provided. Each of these through holes include joined first and second openings. The first opening is located closer to the first sidewall and the second opening is located closer to the second sidewall. These members are particularly useful in combinations in which a lamp is located at least partially in a lamp housing. A member, as noted above, is provided in close proximity to the lamp face, for example, by fastener assemblies, to reduce the risk of the lamp falling from the housing, for example, during extreme storm conditions.

20 Claims, 3 Drawing Sheets

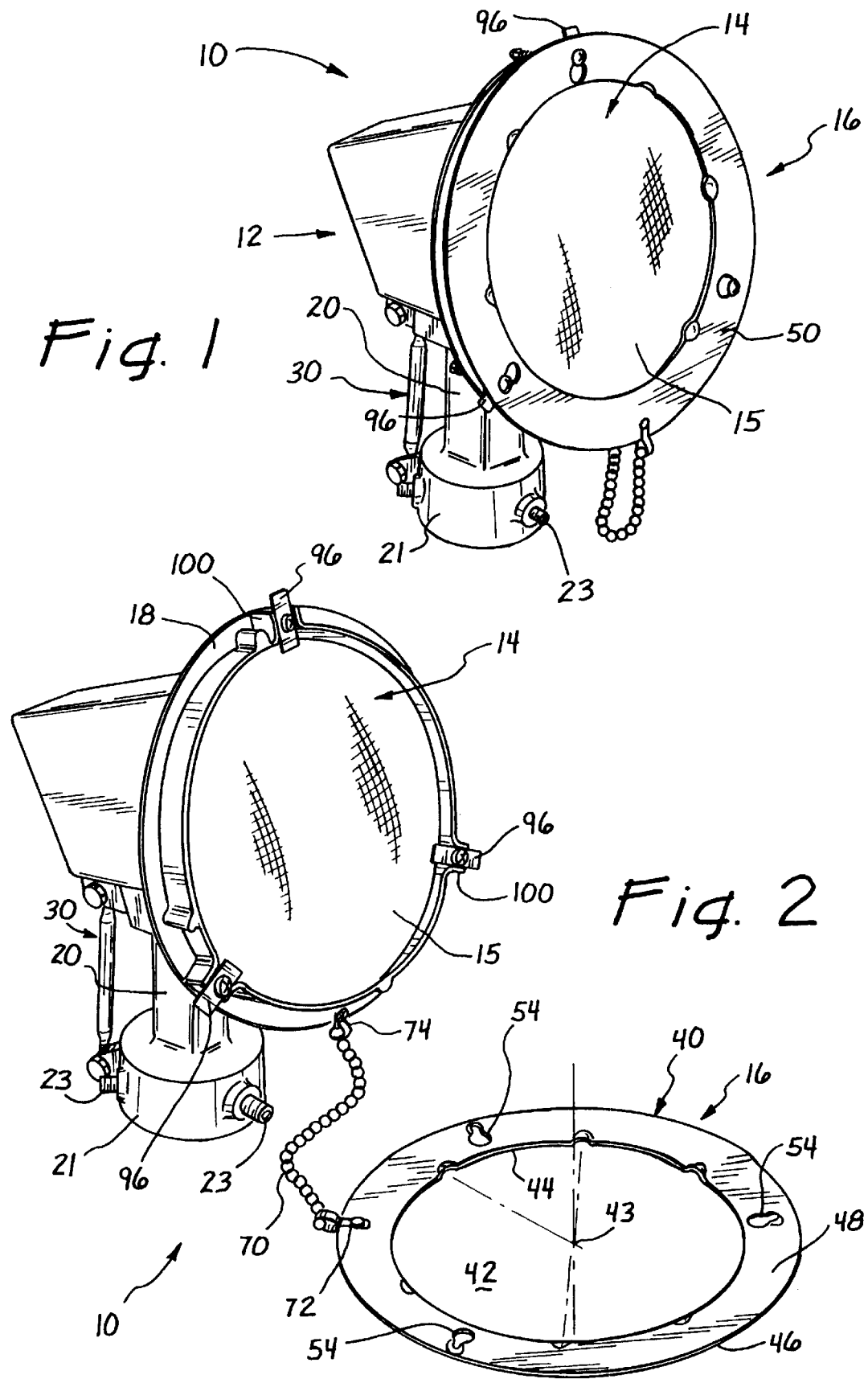

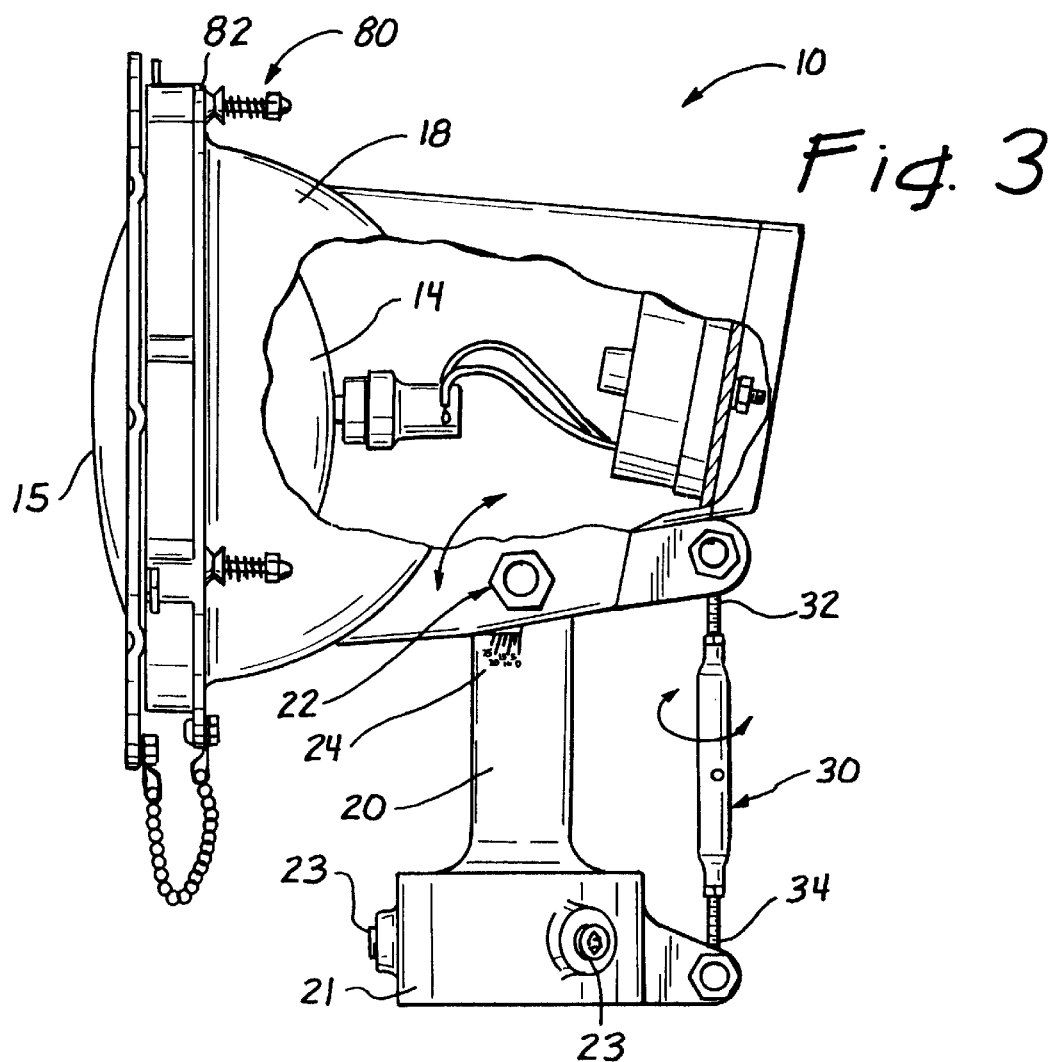
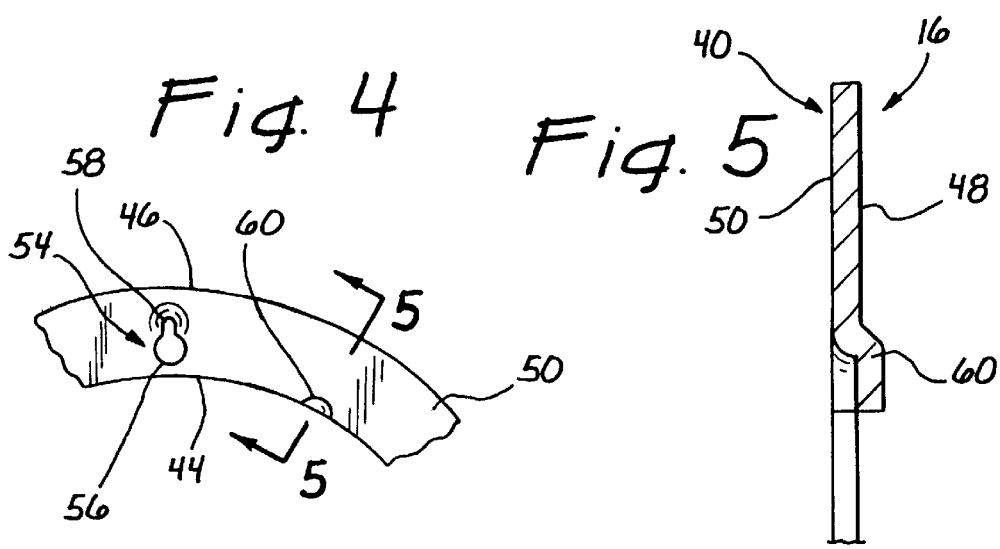

LAMP RETAINER RING AND LAMPHOLDER ASSEMBLY

BACKGROUND OF THE INVENTION

This invention relates to a lamp retainer ring and a lampholder assembly, for example, for individual lamps in a multilamp lighting system, such as a high intensity approach lighting system for an airport. More particularly, the invention relates to such a retainer ring and lampholder assembly which are effective in securing the lamp in the lamp housing even under severe storm conditions, and preferably in maintaining desired alignment even in the presence of jet blasts and high winds.

Many airports today, particularly those having Category II runways under Federal Aviation Administration (FAA) classification criteria, are equipped with a dual mode high intensity approach lighting system. Such a system provides visual approach lighting patterns to landing aircraft, and typically has a first high intensity approach lighting system mode and a second simplified short approach lighting system mode. The typical system is capable of providing 3000 foot patterns with any needed glide slope angle restrictions, and also shorter 2400 foot patterns for use on other domestic Category II runways, and includes both steady burning approach lights and sequenced flashing lights to provide directional guidance to the approaching aircraft. The steady burning approach lights are connected in a number of constant current lighting loops, and may be operated at several, for example, five, distinct brightness levels. Switching between the modes may be locally controlled from an adjacent substation, or remotely controlled from the air traffic control tower via a control subsystem.

In the first high intensity approach mode, the typical system includes approximately 100 lamps of the 300 to 500 watt type, connected in series in each of a plurality, for example, three, constant current loops. Additionally, fifteen flashers are active in a typical embodiment, so that the sequence will begin with the flasher farthest from the threshold of the runway and proceed toward the flasher closest to the runway threshold. Of course, the actual number of lamps and lamp wattage may vary for each loop of steady burning lights, and the number of flashers may vary for a specific application.

Such lighting systems are described in more detail in Manson U.S. Pat. No. 5,397,963, the disclosure of which is hereby incorporated in its entirety herein by reference.

The individual lamps of such multilamp lighting systems should be properly positioned initially and should maintain such proper positioning over time to provide highly effective system performance. In addition, the individual lamps should be easily and rapidly replaced when necessary to insure effective continuous operation.

Prior designs have stressed this rapid lamp change out feature. One such prior design employed a lamp housing holding a lamp. Compression loaded spring fasteners, secured to the housing, were passed through a plurality of individual spaced apart tabs which contacted the lamp and held it in the housing. Although this design allowed quick replacement of the lamp, it had a substantial problem. During severe storm conditions, which cannot be avoided because of the out-of-doors service in which such lamps are used, the lamps had an unacceptable tendency to fall out of the housings.

It would be advantageous to provide retainer systems and lampholder assemblies which are effective to hold a lamp in or to a housing and allow the lamp to be rapidly and easily replaced, when necessary.

SUMMARY OF THE INVENTION

New apparatus for use in retaining lamps in housings and combinations or assemblies including such apparatus have been discovered. Such apparatus are straightforward in construction, easy and relatively inexpensive to manufacture and are effective in maintaining lamps in their housings, even under severe storm conditions. Importantly, these benefits are achieved while providing for rapid and easy replacement of the lamps from their housings, when necessary, for example, in the event of a malfunctioning of the lamp.

In one broad aspect of the present invention, apparatus for use in retaining a lamp in a housing comprise a ring member having a central opening, a first sidewall facing the central opening, a substantially opposing sidewall facing away from the central opening, a front wall extending between the first and second sidewalls, and a substantially opposing back wall extending between the first and second sidewalls. A plurality, preferably in the range of 2 to about 6 or more, of spaced apart through holes pass through the ring member from the front wall to the back wall. Each of these through holes includes joined first and second openings of different sizes. The first opening is located closer to the first sidewall and the second opening is located closer to the second sidewall. Preferably, the first opening of each of the through holes is larger than the second opening.

The present ring member can be very rapidly positioned on the lampholder, in proximity to the lamp face, to at least assist in holding the lamp in or to the lampholder. The configurations of the present ring members, as described herein, provide for rapid placement on the lampholder and rapid removal from the lampholder, as well as performance effectiveness in facilitating holding the lamp in or to the lampholder. The configurations and orientations of the through holes of the ring member, for example, allow the ring holder to be placed on/removed from the lampholder substantially without being rotated relative to the lampholder and/or without requiring additional tools for such placement/removal.

In a very useful embodiment, the ring member is generally circular in configuration. However, it should be understood that other configurations, such as oval, rectangular, polygonal and the like, may be employed with regard to the member in accordance with the present invention. The configuration of the ring member should be compatible with the configuration of the lamp to be held in or to the housing.

The ring member has a center through which a central axis passes. The through holes preferably are oriented in the ring member so that the first and second openings of each of the through holes are radially aligned between the center of the member and the second or outer sidewall of the member. Although it is preferred that the entire first opening be located closer to the first sidewall and the second opening be located in its entirety closer to the second sidewall, the orientation of the first and second openings of each of the through holes can be varied without departing from the spirit of the present invention.

Preferably the shortest distance between the center and the first sidewall is greater than the shortest distance between the first and second sidewalls of the ring member. More preferably, the shortest distance between the center of the ring member and the first sidewall is in the range of about 2 to about 5 times the shortest distance between the first and second sidewalls. Thus, it is preferred that the central opening defined by the ring member be relatively large in relation to the distance between the first and second sidewalls of the ring member. This is advantageous because the lamp face through which light is provided or emitted by the lamp is to be exposed through the central opening. The present retaining apparatus allows such light to be provided while, at the same time, providing enhanced retention of the lamp in or to the housing, as described herein.

The through holes preferably are spaced apart from both the first and second sidewalls. In other words, the through holes preferably do not extend to either the first sidewall or the second sidewall. Thus, the through holes preferably are surrounded by the solid material, and more preferably the metal, of the ring member.

In one useful embodiment, the member further includes a plurality of spaced apart regions which extend rearwardly relative to the back wall of the member. These spaced apart regions preferably act to contact the lamp face with the ring member in place and performing its lamp retaining function. These points of contact spread the force provided or by the member to different points on the lamp face. The plurality of spaced apart regions preferably extend to the first sidewall. The number of spaced apart regions can vary over a relatively wide range, for example, in a range of 2 to about 10, and more preferably exceeds the number of the through holes. The spaced apart regions are very effective when provided equidistantly spaced apart relative to or around the ring member.

One very useful embodiment in accordance with the present invention provides that the retaining apparatus further comprise a securement assembly, for example, in the form of a flexible member, such as a chain, strip of polymeric material and the like, including a first end secured to the ring member and a substantially opposing second end adapted to be secured to the housing in which the lamp is to be located. This securement assembly is very advantageous when the ring member is displaced from the lamp face, for example, to remove the lamp from the housing. Thus, the ring member continues to be attached to the housing through the securement assembly so that once the lamp has been replaced or otherwise maintained, the retainer ring can be easily and quickly repositioned relative to the housing to provide the lamp retention benefits described herein.

In another broad aspect of the present invention, combinations are provided which comprise lamps, housings, pluralities of spaced apart fastener assemblies and ring members, such as those described elsewhere herein.

The lamps include lamp faces and are adapted to emit light through the lamp faces. Each of the housings has an opening, with a lamp being at least partially located in the housing with the lamp face in proximity to the opening. The ring member is placed so that the back wall of the member faces the lamp face. A portion of one of the fastener assemblies passes through one of the first and second openings of each of the through holes of the ring member to hold the member in proximity to the lamp face.

These combinations are very effective for holding a lamp which emits light through the lamp face and substantially reduce the risk of the lamp falling from the lamp housing, for example, in severe storm conditions.

In one embodiment, the housing includes a lamp housing including the opening, and a housing base coupled to the lamp housing. Preferably, the lamp housing has an angular position relative to the housing base and the lamp housing and the housing base are coupled to allow this angular position to be adjusted. The present combinations preferably further comprise a turnbuckle element having a first end portion secured to the lamp housing and a substantially opposing second end portion secured to the housing base. This turnbuckle element, which is advantageously spaced apart from the primary coupling point between the lamp housing and the housing base, provides at least two benefits to the present combinations. Firstly, the turnbuckle element is effective in providing the proper adjustment of the angular position of the lamp housing relative to the housing base. Secondly, the turnbuckle element is effective in keeping the housing in alignment in the presence of jet blasts or high winds. This is particularly important when the combinations are used in a multi-lamp system for use in guiding aircraft to airports. Such alignment is highly desirable to achieve a high degree of effectiveness for such multi-lamp lighting systems.

The present fastener assemblies each preferably include a shank, an enlarged head at one end of the shank, a cap on the substantially opposing end of the shank, and a compression spring member on the shank between the housing and the cap. The shank passes through the smaller of the first and second openings of one of the through holes of the ring member and the enlarged head is in contact with the ring member. Thus, the fastener assemblies, including a compression spring, bias the ring member toward the lamp face. Such biasing force is effective in holding the lamp in or to the lamp housing. In a further embodiment, each of the fastener assemblies includes a tab having a hole through which the shank of the fastener assembly passes. The tab is located between the member and the lamp face and extends outwardly beyond the member. These tabs are effective in holding the lamp in or to the lamp housing.

The present combinations can be rapidly and easily disassembled to allow replacement of the lamp in the lamp housing, as required. In particular, with regard to the preferred construction described herein, when it is desired to replace the lamp from the lamp housing, a single human workman is employed. This workman manually forces the shank of each fastener assembly toward the housing thereby compressing the spring member. This results in the enlarged head of the shank moving away from the ring member. Once this has occurred, the shank is maneuvered so that the shank passes through the larger opening of the through hole of the ring member. This larger opening is sized so that the enlarged head passes completely through this larger opening. In this way, after all the fastener assemblies have been manipulated as described above, the ring member is removed from the face of the lamp housing. If a tab is present in each fastener assembly, the tab can be rotated relative to the shank and the housing to remove the tab from contact with the lamp face. With the ring member removed, and the tabs rotated out of the way, the lamp can be easily replaced or otherwise maintained. During the time the lamp is being replaced and after the ring member has been removed from the lamp face, the securement assembly, discussed elsewhere herein, is effective to hold the ring member to the housing so that it is readily available for reuse.

After replacement of the lamp or other maintenance, the tabs, if any, are rotated to be placed in proximity to or in contact with the lamp face. The compression spring of each of the fastener assemblies, in turn, is squeezed again to provide the enlarged head of the shank away from the lamp. The enlarged head of the shank is passed through the larger opening of one of the through holes of the ring member. The shank is then manipulated so that the shank passes through the smaller opening of the through hole. At this point, the compression spring is released which causes the enlarged head of the shank to come in contact with the ring member and to draw the ring member against the lamp face. After all of the fastener assemblies have been so manipulated, the member is again in place and is effective in providing benefits, as described herein.

These and other aspects of the present invention are set forth in the following detailed description and accompanying claims, particularly when considered in conjunction with the accompanying drawings in which like parts bear like reference numerals.

BRIEF DESCRIPTION OF THE DRAWINGS

FIG. 1 is a front side view, in perspective, of a lamp combination in accordance with the present invention showing the retaining ring in place in proximity to the lamp face.

FIG. 2 is a front side view, in perspective, of the lamp combination shown in FIG. 1 with the retaining ring separated from the lamp face.

FIG. 3 is a side view, with a portion of the housing cut away, of the lamp combination shown in FIG. 1.

FIG. 4 is a fragmentary plan view of a portion of the retaining ring shown in FIG. 1.

FIG. 5 is a cross-sectional view taken generally along line 5—5 of FIG. 4.

DETAILED DESCRIPTION OF THE DRAWINGS

Figure 6:
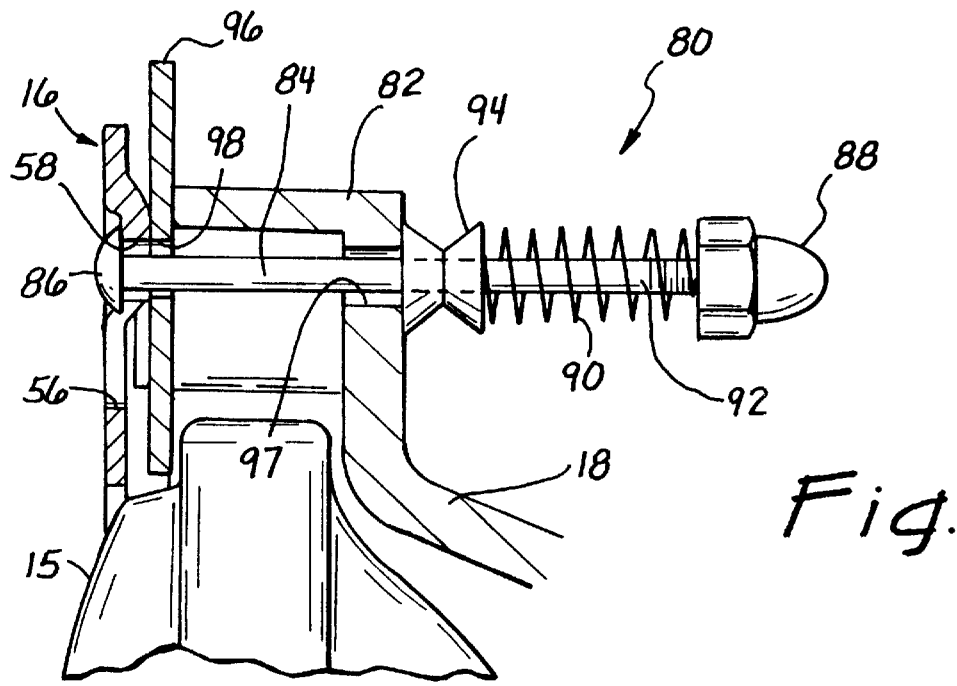
FIG. 6 is a fragmentary view, partly in cross-section, showing a fastener assembly holding the retaining ring to the housing.

Referring now to the drawings, and in particular FIGS. 1, 2 and 3, a lamp combination, shown generally at 10, includes a housing 12, a lamp 14, such as a 300 to 500 or more watt lamp, and a retainer ring 16. Combination 10 includes an individual lamp 14 which preferably is part of a multi-lamp system, for example, used in guiding aircraft to airports. See Manson U.S. Pat. No. 5,397,963. It should be noted that combination 10 can be used in other applications where lamp 14, or a like lamp, is useful.

Housing 12 includes a lamp housing 18 and a housing base 20. Nut and bolt assembly 22 provides for coupling the lamp housing 18 to the housing base 20 and allows the angular orientation of the lamp housing relative to the housing base to be adjusted, as shown by the rotation arrows in FIG. 3. Index markings 24 on housing base 20 provide a reference as to the angle of lamp housing 18 relative to housing base 20. The bottom 21 of housing base 20 includes threaded screws 23 which are used to fix or secure the housing 12 to a stationary support (not shown)

A conventional turnbuckle 30 is provided and includes a first end 32 secured to the lamp housing 18 and a second end 34 secured to the housing base 20. Turnbuckle 30 is spaced apart from the primary coupling point, nut/bolt assembly 22, between the lamp housing 18 and housing base 20.

The angular orientation of lamp housing 18 relative to housing base 20 can be set as follows. With nut/bolt assembly 22 loosened to allow relative movement to the lamp housing 18 and housing base 20, the turnbuckle 30 is rotated, as shown in FIG. 1, which causes the lamp housing 18 to rotate about nut/bolt assembly 22 relative to housing base 20, again as shown in FIG. 1. Once the proper angular orientation is achieved, the nut/bolt assembly 22 is tightened to prevent movement of the lamp housing 18 relative to the housing base 20. One additional advantage of the turnbuckle 30 is that the proper angular orientation or alignment of the lamp housing 18 and housing base 20 is more effectively maintained in the presence of jet blasts or high winds relative to a similar lamp housing/housing base combination without a turnbuckle.

Retaining ring 16 includes an annular ring 40 which defines a central opening 42 and has a center 43. Annular ring 40 includes an inner sidewall 44, an outer sidewall 46, a back wall 48 and a front wall 50. Retaining ring 16 has a substantial degree of rigidity and is made of a metal and coated with pain for protection against weather conditions. Retainer ring 16 is generally circular in configuration. That is, the annular ring 40, as well as central opening 42, is generally circular in configuration around center 43.

Three (3) equidistantly spaced apart through holes 54 are located in and through annular ring 40 and do not extend to either inner sidewall 44 or outer sidewall 46.

With particular reference to FIG. 4, each of the through holes 54 includes a relatively large opening 56 and a relatively small opening 58 which are joined together. The relatively large opening 56 is closer to the inner sidewall 44 and the small opening 58 is closer to the outer sidewall 46, although this arrangement can be reversed. The openings 56 and 58 of through holes 54 are radially aligned with the center 43 of retaining ring 16. That is, a line passing through center 43 also passes through the center of opening 56 and the center of opening 58. In other words, opening 56 and opening 58 of each of the through holes 54 are aligned in the radial direction.

With reference to FIGS. 1, 2, 4 and 5, annular ring 40 includes six equidistantly spaced apart regions 60. These regions 60, each of which extend to the inner sidewall 44, also extend rearwardly beyond back wall 48. Regions 60 are effective when the retaining ring 16 is situated on the housing in proximity to the lamp face 15 of lamp 14. Thus, these regions 60 distribute any force that may be exerted by the retaining ring 16 on the lamp face 15 to reduce any risk that the retaining ring may damage or break the lamp 14 or the lamp face 15.

A flexible chain 70 is provided with one end 72 secured to the annular ring 40 and a substantially opposing end 74 secured to the lamp housing 18. This flexible chain 70 is effective to prevent the retaining ring 16 from being lost or misplaced after being removed from being in proximity to the lamp face 15.

Combination 10 further includes three equidistantly spaced apart fastener assemblies 80 around the front rim 82 of lamp housing 18. With particular reference to FIG. 6, each of the fastener assemblies 80 includes an elongated shank 84 having an enlarged head 86 at one end and a spring retaining cap 88 on the substantially opposing other end. A compression spring member 90 is positioned about the rear portion 92 of shank 84 and is located between the cap 88 and a spacer element 94 which is in contact with the front rim 82 of lamp housing 18. Thus, shank 84 extends forwardly from cap 88 through hole 97 in rim 82 to enlarged head 86.

A series of three (3) tabs 96, generally rectangular in configuration, are provided. One tab 96 is provided on each shank 84, which passes through hole 98 in the tab. The front rim 82 of lamp housing 18 is configured with three (3) sets of features 100 which maintain the tabs 96 in a position in which the tabs extend outwardly beyond the front rim 82, as shown in FIGS. 1 and 2. In this position, the tabs 96 are in contact with, or in close proximity to, the lamp face 15 and are effective (at least in cold weather conditions) to hold the lamp 14 in or to the lamp housing 18.

With retaining ring 16 in place in proximity to lamp face 15, each shank 84 passes through smaller opening 58 of a different through hole 54. These smaller openings 58 are sized so that the enlarged heads 86 of shank 84 cannot pass through. Thus, each enlarged head 86 comes in contact with retaining ring 16 in the vicinity of the smaller opening 58 of a different through hole 54, as shown in FIG. 6. Each of the tabs 96 is positioned to extend outwardly of front rim 82 and retaining ring 16, as shown in FIGS. 1 and 6. The force exerted by compression spring member 90 on shank 84 causes retaining ring 86 to exert a force against lamp face 14. This force helps hold the lamp 15 in or to lamp housing 18, particularly during severe storm conditions.

Figure 7:
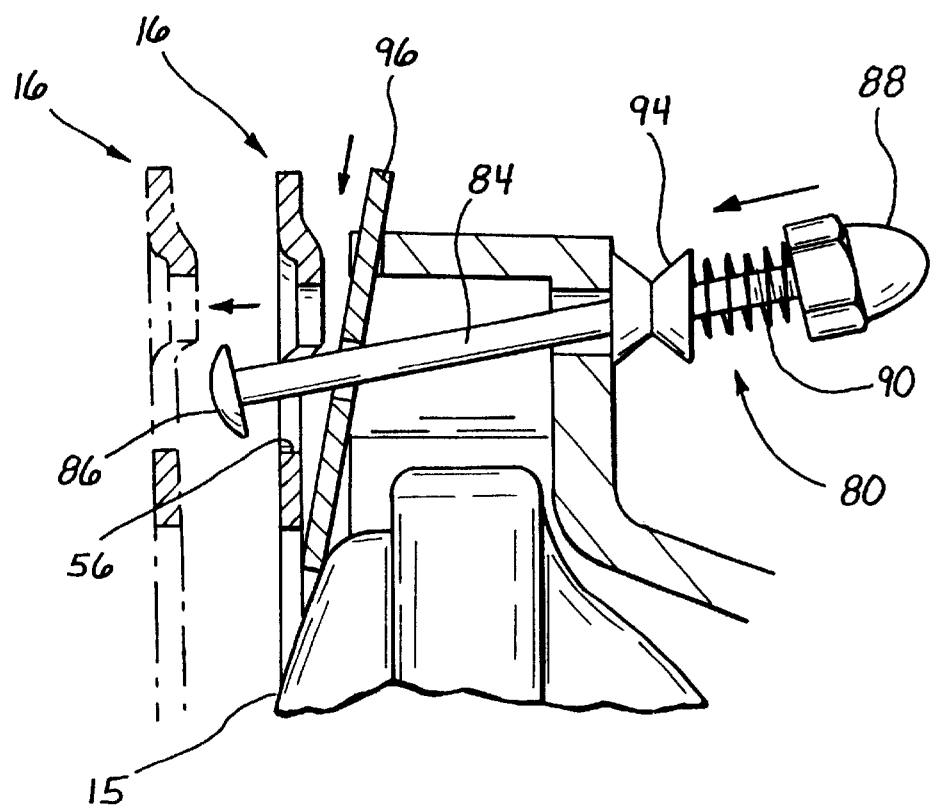
FIG. 7 is a fragmentary view, partly in cross-section, showing a fastener assembly being manipulated to separate the retaining ring from the housing.

FIG. 7 demonstrates how the retaining ring 16 can be separated from the lamp face 15. Such procedures can be conveniently employed by a single human being without any additional tools or assistance, for example, when it is necessary to replace or otherwise repair the lamp 14 associated with housing 12. Thus, as shown in FIG. 7, the cap 88 is moved forward. This causes the shank 84 and enlarged head 86 to move forwardly. The associated tab 96 is moved downwardly which causes the forward end of shank 84 and the elongated head 86 to move downwardly causing the shank to pass out of the smaller opening 58 and into and through the larger opening 56 of through hole 54. Larger opening 56 is sized so that the enlarged head 86 can pass through this opening. Thus, enlarged head 86 passes through larger opening 56 thereby separating the retaining ring 16 from the lamp face 15 in the vicinity of the fastener assembly 80 being manipulated. Each of the fastener assemblies 80 is manipulated in turn, as described herein to completely separate the retaining ring 16 from the lamp face 15. The tabs 96 can be rotated so as to be separated from the lamp face 15, by compressing the spring members 90 and manually rotating the tabs. Once the retaining ring 16 and tabs 96 are separated from the lamp face 15, the lamp 14 in the lamp housing 18 can be easily accessed for repair or replacement.

When it is desired to replace the retaining ring 16 in proximity to the lamp face 14, the above-noted procedure is substantially reversed to provide this positioning. Briefly, each of the fastener assemblies 80, in turn, is manipulated as follows. With cap 88 moved forward and enlarged head 86 oriented downwardly, the retaining ring 16 is positioned so that the enlarged head passes into and through the larger opening 56 of one of the through holes 54. The cap 88 is than released. This urges the shank 84 to seek a horizontal orientation. Thus, shank 84 leaves larger opening 56 and enters and passes through smaller opening 58. The tabs 96 can be reoriented so that they extend outwardly beyond the front rim 82 either before or after the retaining ring 16 is repositioned in proximity to the lamp face 15.

While this invention has been described with respect to various specific examples and embodiments, it is to be understood that the invention is not limited thereto and that it can be variously practiced within the scope of the following claims.

What is claimed is:

1. An apparatus for use in retaining a lamp in a housing comprising:
    a ring member structured to be affixed anterior an opening of a housing and to contact a face of a lamp located within the housing to retain the lamp in the housing, said ring member having a central opening, a first sidewall facing the central opening, a substantially opposing second sidewall facing away from the central opening, a front wall extending between the first and second sidewalls, and a substantially opposing back wall extending between the first and second sidewalls;
    a plurality of spaced apart through holes passing through the ring member from the front wall to the back wall; and
    each of the through holes including joined first and second openings of different sizes, the first opening being located closer to the first sidewall and the second opening being located closer to the second sidewall.

2. The apparatus of claim 1 wherein the first opening of each of the through holes is larger than the second opening.

3. The apparatus of claim 1 wherein the ring member is generally circular in configuration.

4. The apparatus of claim 1 wherein the ring member has a center and the shortest distance between the center and the first sidewall is greater than the shortest distance between the first and second sidewalls.

5. The apparatus of claim 1 wherein the number of through holes is in a range of 2 to about 6, and the through holes are equidistantly spaced apart through the ring member.

6. The apparatus of claim 1 wherein the through holes are spaced apart from the first and second sidewalls.

7. The apparatus of claim 1 wherein the ring member includes a plurality of spaced apart regions which extend rearwardly relative to the back wall.

8. The apparatus of claim 7 wherein the plurality of spaced apart regions extend to the first sidewall, and the number of spaced apart regions exceeds the number of the through holes.

9. The apparatus of claim 7 wherein the number of spaced apart regions is in a range of 2 to about 10.

10. The apparatus of claim 1 wherein the ring member comprises metal.

11. The apparatus of claim 1 which further comprises a securement assembly including a first end secured to the ring member and a substantially opposing second end adapted to be secured to the housing.

12. A combination comprising:
    a lamp including a lamp face; and
    a housing having an opening, the lamp being at least partially located in the housing with the lamp face in proximity to the opening;
    a plurality of spaced apart fastener assemblies positioned to assist in holding the lamp to the housing;
    a ring member affixed anterior the opening of the housing and in contact with the lamp face to retain the lamp in the housing, said ring member having a central opening, a first sidewall facing the central opening, a substantially opposing second sidewall facing away from the central opening, a front wall and a substantially opposing back wall each extending between the first and second sidewall, the back wall facing the lamp face;
    a plurality of spaced apart through holes passing through the ring member from the front wall to the back wall;
    each of the through holes including joined first and second openings of different sizes, the first opening being located closer to the first sidewall and the second opening being located closer to the second sidewall; and
    a portion of one of the fastener assemblies passing through one of the first and the second openings of each of the through holes to hold the member in proximity to the lamp face.

13. The combination of claim 12 wherein the first opening of each of the through holes is larger than the second opening, and a portion of one of the fastener assemblies passes through the second opening of each of the through holes to hold the ring member in proximity to the lamp face.

14. The combination of claim 12 wherein the housing includes a lamp housing including the opening and a housing base coupled to the lamp housing.

15. The combination of claim 14 wherein the lamp housing has an angular position relative to the housing base and the lamp housing and the housing base are coupled to allow the angular position to be adjusted, and which further comprises a turnbuckle element having a first end portion secured to the lamp housing and a substantially opposing second end portion secured to the housing base.

16. The combination of claim 12 wherein each of the fastener assemblies include a shank, an enlarged head on one end of the shank, a cap on the opposing end of the shank, a compression spring member on the shank between the housing and the cap, the shank passing through the smaller of the first and second openings and the enlarged head being in contact with the ring member.

17. The combination of claim 12 wherein each of the fastener assemblies further includes a tab including a hole through which a shank passes, the tab being located between the ring member and the lamp face.

18. The combination of claim 12 wherein the number of through holes is in a range of 2 to about 6, and the through holes are equidistantly spaced apart through the ring member.

19. The combination of claim 12 wherein the ring member includes a plurality of spaced apart regions which extend rearwardly relative to the back wall, and extend to the first sidewall and are in contact with the lamp face.

20. The combination of claim 12 which further comprises a securement assembly including a first end secured to the ring member and a second end adapted to be secured to the housing.

* * * * *